United States Patent
Skopicki

(10) Patent No.: US 6,859,797 B1
(45) Date of Patent: Feb. 22, 2005

(54) PROCESS FOR THE IDENTIFICATION OF A DOCUMENT

(75) Inventor: Jakob Skopicki, Rue de l'Abbaye aux Bois, Bievres (FR), 91570

(73) Assignees: Sanyo France Calculatrices Electroniques, S.F.C.E., Antony (FR); Jakob Skopicki, Bievres (FR)

(*) Notice: Subject to any disclaimer, the term of this patent is extended or adjusted under 35 U.S.C. 154(b) by 0 days.

(21) Appl. No.: 09/521,964

(22) Filed: Mar. 9, 2000

(30) Foreign Application Priority Data

Mar. 9, 1999 (FR) .......................................... 99 02925

(51) Int. Cl.[7] .............................................. G06F 15/18
(52) U.S. Cl. ...................................................... 706/20
(58) Field of Search ............................... 706/20, 45–47

(56) References Cited

U.S. PATENT DOCUMENTS

| | | | | |
|---|---|---|---|---|
| 4,891,771 A | * | 1/1990 | Edel et al. ................... 715/521 |
| 4,918,588 A | * | 4/1990 | Barrett et al. ................. 707/10 |
| 4,991,200 A | * | 2/1991 | Lin ........................ 379/100.15 |
| 5,075,875 A | * | 12/1991 | Love et al. ................. 358/1.18 |
| 5,131,077 A | * | 7/1992 | Indei ......................... 358/1.14 |
| 5,241,466 A | * | 8/1993 | Perry et al. ..................... 705/1 |
| 5,430,462 A | * | 7/1995 | Katagiri et al. ............. 345/104 |
| 5,889,886 A | * | 3/1999 | Mahoney .................... 382/176 |
| 5,999,664 A | * | 12/1999 | Mahoney et al. ........... 382/305 |

OTHER PUBLICATIONS

Data Clustering: A Review, A.K. Jain; M.N. Murty and P.J. Flynn; ACM Computing Surveys (CSUR) vol. 31, Issue 3, (Sep. 1999), pp.: 264–323.*

User recovery of audio operations Mashayekhi, V.; Maley, Riedl, J.; Multimedia Computing and Systems, 1995., Proceedings of the International Conference on , May 15–18, 1995 pp.:329–334.*

Data Clustering: A Review, A.K. Jain; M.N. Murty and P.J. Flynn; ACM Computing Surveys (CSUR) vol. 31, Issue 3, (Sep. 1999), pp.: 264–323.*

* cited by examiner

Primary Examiner—Anthony Knight
Assistant Examiner—Michael B. Holmes
(74) Attorney, Agent, or Firm—Young & Thompson

(57) ABSTRACT

A process for the automatic identification of a document in a computer includes analyzing the data contained in the document according to their content and/or their position in the document and then comparing one by one to one or more identification criteria for the document, an identification criterion being defined by the content and/or the position of a characteristic datum of the document.

16 Claims, 1 Drawing Sheet

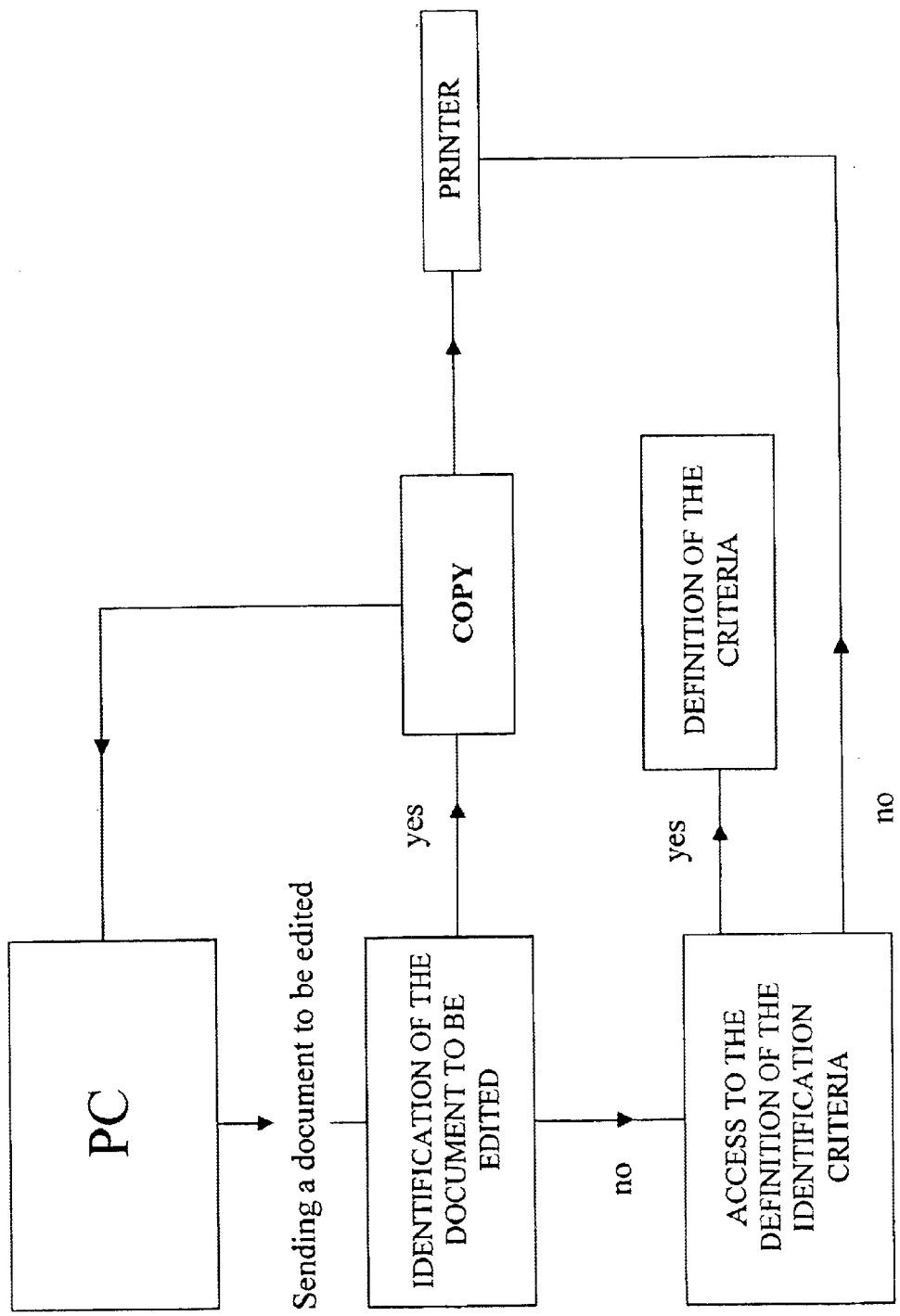
SINGLE FIGURE

PROCESS FOR THE IDENTIFICATION OF A DOCUMENT

BACKGROUND OF THE INVENTION

The present invention relates to a process for the automatic identification of a document in a computer as well as a process for automatically classifying and filing edited documents in a computer using the identification process as well as its device for practicing the same.

DESCRIPTION OF THE RELATED ART

Generally speaking, when a document is printed from a computer such as a letter, a report, a text for example, it is often necessary to copy this document to subsequently classify it into different classifications permitting retrieving it by various search routes. For example, a classification can be carried out by a client file, by the file of the object with which the document deals, or else by a chronological classification of the original documents. Such a filing technique takes up space and time.

There are already known filing processes available in computers associated with a process for searching filed documents. Thus, when a document has been prepared such as a letter and it is decided to file this document, recourse is had to a system of classification of the document in which the classification parameters are defined, such as for example the type of document, the person, an event, etc. Once these parameters are chosen, one or several classifications are used, a classification containing the documents having a common characteristic. During search, one or several of these search criteria are entered, permitting accessing said document. There is thus a personal archive of the documents.

It has also been proposed to conduct automatic archiving of the edited documents in which the nature of the document is recognized by the printer. This recognition is carried out for example for the first document edited in a stream of documents, this first document being recognized as having been classified in a classification according to the particular characteristics that it possesses, the rest of the edited documents will also be memorized in the same classification.

Such a process requires a substantial learning phase to the extent that it is necessary to define first of all the identification criteria of a type of document for its recognition and its filing in a data base. Such a learning process is difficult to practice and is not within the skill of an ordinary user.

There is also known from WO-A-9702536, a process for filing documents in which an acquisition and reading circuit controls the memory of a microcomputer by means of the last signals output from an operating printer, which produce the presentation of the printed material and file in the microcomputer an identical binary reproduction of the document to be printed, for example on a non-erasable data support such as a CD ROM. However, such a process, if it copies all the documents edited by a printer, does not permit classified filing of the documents permitting their retrieval as a function of specific identification criteria.

A major drawback of these filing processes consists in that it is difficult to be able to identify automatically and easily a document so as to classify it and file it for example. Thus, if one identification criterion is, for example, the presence of a term in the document, all the documents including this term will be identified, which is not of interest for classification.

SUMMARY OF THE INVENTION

To this end, the invention has first of all as its object a process for the automatic identification of a document in a computer, characterized in that the data contained in the document are analyzed according to their content and/or their position in the document and they are compared one by one to one or more of the document identification criteria, an identification criterion being defined by the content and/or the position of a characteristic datum of a document.

Thus, such a process preferably permits identifying a document without ambiguity. Thus, the positive comparison between one datum of a document and an identification criterion of the type of document permits identifying the analyzed document as being of the same type as that defined by the identification criterion because it has a datum whose content and/or position is identical to the identification criterion of the type of document.

Thus, an identification criterion of an invoice could be the term "invoice" at a distance of 3 cm from the left margin and at a distance of 6 cm from the upper edge of the invoice. If the analyzed document has a datum whose content is "invoice" and the position is 3 cm from the left margin and 6 cm from the upper margin of the document, the comparison between these datum and the identification criterion of an invoice is positive, the document is identified as being an invoice. Another identification criterion could be the research of references, the document being then identified as an invoice having such references.

Preferably, when the comparison is negative, it is proposed to define at least one new identification criterion and the parametric window is opened to define at least one new identification criterion associated with this document, said new criterion being memorized to identify thereafter any document having this datum. An identification criterion is defined by copying a datum of the wording of the document serving as an identification criterion toward the parametric window where this datum is copied, associated with its position parameters in the document.

Thus, the identification process according to the invention permits creating progressively identification criteria for new documents and any datum whatsoever of a document can serve to define an identification criterion.

The present invention also has for its object to provide a process for an automatic classification and filing of individual edited documents in a computer in which there can be identified, thanks to the above identification process, each document sent to a printer to file it and define new identification criteria when the document does not contain any already-known identification criterion.

To this end, the present invention has for its object a process for the automatic classification and filing of edited documents from a computer, characterized in that, when the document to be edited is sent to a publishing support, the data contained in the document are analyzed according to their content and/or their position in the document and are compared one by one to one or more of the identification criteria of the document, an identification criterion being defined by the content and/or the position of a characteristic datum of a document; these data of the document are also compared to at least one classification criterion, each criterion corresponding to a type of document to be classified and a classification in the memory of the computer in which are memorized the documents having this criterion; and when the comparison is negative, there can be defined at least one new identification criterion corresponding to a type of document and at least one classification criterion corresponding to a classification in the memory of the computer in which said document is copied; and, when the comparison is positive, said document is automatically copied into the memory of the computer according to the corresponding classification or classifications.

Thus, preferably, the process according to the invention permits automatically filing an edited document from a computer toward a publishing support to the extent that, each time a document is edited, the latter is automatically identified because it has one or several identification criteria representative of a document, the classification criteria permitting determining the number of classifications to which this document belongs and which contain documents of a same type.

By addition support is meant printers but also telecopiers integrated with a computer, the emissions by internet or intranet, copying supports, etc. Thus, it is somewhat the edition support which recognizes the documents sent to it from the computer, copies them, sorts them and automatically classifies them.

In this way, a document can be filed according to several classifications, which offers multiple search routes, the process according to the invention therefore offering the possibility of sorting and classifying edited documents.

Preferably, the document is copied only once into the memory, but as the identification criteria are associated with classification criteria, there exists as many possible search routes as classification criteria. Thus, the process according to the invention offers filing and classification with a minimum of occupied space.

But moreover, when the document is identified as being unknown, which is to say responding to none of the identification criteria, the process, automatically, permits the definition of at least one new identification criterion relative to this new document. Moreover, from the new identification criterion, it is also possible to define at least one classification criterion. Once these criteria are defined, the document is filed in a classification adapted to contain progressively the documents of the same classification criterion and of the same identification criterion whilst the identification criterion or criteria as well as the classification criterion or criteria are memorized and will serve for the identification of subsequent edited documents and their filing.

Thus, the process according to the invention offers the possibility of defining progressively with the emission of different documents, new identification criteria and classification criteria characteristic of these documents.

There results a great flexibility in that it is not necessary first to define a document.

According to a first embodiment, the identification criterion and the classification criterion are defined at the same time as the document is sent toward a publishing support such as for example a printer. This process therefore permits individually processing each document arriving at the publishing support.

Thus, the document en route toward the publishing support is analyzed. When the comparison is negative, the user can then define one or more identification criteria to recognize thereafter this type of document as well as the classification criteria to file it in the different types of classification and then to edit this document. The user can also choose not to define the identification criteria and the document is simply published.

When the comparison is positive, the recognized document is filed and published.

According to a second embodiment of the process of the invention, all the unidentified edited documents from one or several computers are stored temporarily in a library where a user, preferably an authorized one, can cause the analysis of these documents.

Thus, the analyzed documents are either identified and filed or unidentified and, in this case, it is possible to define new identification criteria and classification criteria or to destroy the documents which one does not desire to identify and file.

This embodiment is preferable, because it permits storage of the edited documents from one or several computers in a single library which permits greater security by giving to each user emitting a document the possibility of destroying this document if it is not identified and filed.

Preferably, each identification criterion is specific to a characteristic datum of a document and an identification criterion is constituted both by the content of the datum belonging to the text of the document and to the positioning parameters of this datum in the document.

The analysis of the data contained in the document to be edited takes place preferably at two levels, on the one hand the research of the content of a datum in the text of the document and on the other hand the search for position parameters of this datum in the document.

Upon a negative comparison between the identification criteria already known and a document to be edited, this document is recognized as unidentified and hence not fileable. A parametric window is thus opened to define at least one new identification criterion associated with this document and at least one classification criterion, said new criterion being memorized to identify thereafter any document responding to the same identification criterion and the classification criterion controlling its automatic filing in the associated classification. This definition is carried out by the copying of a datum of the text of the document serving as an identification criterion, toward the parametric window where the data is copied associated preferably with its position parameters in the document. There is then copied into the memory of the computer the document in a classification associated with the new identification criterion.

Thus, the definition of the identification criteria takes place in a very simple manner by a simple manipulation (copy-slide-glue) which permits this by all the computer users, even beginners.

The identification criterion can be a type of criterion in which several turns are admitted. For example, at a given place in the document, there can be the term "invoice" but one should also be able to identify the term to have, debit note, etc., at the same position as identifying a document of the same type belonging to a same classification. By "term", is meant for example a word, a series of letters or numbers or a given number of numerals or of letters no matter what their meaning.

The new identification criteria defined are memorized and will serve for the identification of a document having the same characteristics during subsequent publishing.

There are also defined the criteria for classification which serve for automatic filing of said document in a given classification, these criteria corresponding to the presence of a term or a series of terms in a document, for example.

The process according to the invention can be associated with one or several publishing supports, preferably at the choice of the user, who then selects not only a publishing support but also selects the association of this publishing support to the process of automatic classification and filing according to the invention.

The present invention also has for its object a device for practicing the process according to the invention, characterized in that it comprises means for analyzing the data contained in a document to be edited, sent from a computer toward a publishing support, means for comparing said data one by one with one or several identification criteria in the memory, means for copying into the memory of the computer the document upon a positive comparison and means for defining at least one identification criterion and at least one classification criterion of a document upon a negative comparison.

Preferably, the means for analyzing the data can be constituted by analysis means and transcoding the signals emitted from the computer toward the publishing support.

When the comparison is negative, means for defining new identification criteria are triggered, these definition means comprising copying means (copier-slider-gluer) permitting transfer toward a memory of a portion of the document both as to its text and as to the parameters defining its place in the document, said definition means also comprising means for writing data permitting the user to denominate a type of document associated with these identification criteria for example. The newly-defined identification criteria are kept in the memory and permit an identification, a classification and an automatic filing of a document upon ultimate publishing.

Preferably, the device for practicing the process according to the invention is associated with the printing control of a printer. There can therefore be selected the positioning of the device relative to the publishing support. Thus, among several printers connected to the computer, there is selected one or several of these printers to work with the device according to the invention and only the prints sent toward this printer will be identified, classified and filed. Any other publication support (fax, internet, etc.) can be associated with the printers and hence with the device according to the invention.

BRIEF DESCRIPTION OF THE DRAWINGS

There will now be described the invention in greater detail with reference to the drawing in which the single FIGURE shows schematically the different steps of the process of classification and automatic filing according to the invention.

DESCRIPTION OF THE PREFERRED EMBODIMENT

During sending a document to be published, from a computer (PC) toward a publishing support such as a printer 1, the identification of the document to be published is carried out by analyzing the data contained in said document and comparing them one by one to one or several identification criteria.

These identification criteria permit characterizing a document both by its content and by the position of the data in said document. Thus, an invoice could be characterized by the identification criteria such as the term "invoice" at 15 cm from the left edge and at 6 cm from the upper edge of the document, the term "date" at 15 cm from the left edge and 8 cm from the upper edge of the document.

For a letter, one of the identification criteria could correspond to the range of position in the letter corresponding to the address and in which is recognized a series of five digits (postal code) for example.

When these two identification criteria are recognized in the document to be published, the classification criteria are noted, such as the name of the client and this document is copied into the memory of the computer according to a classification including the documents of the same type such as "invoice" and in a classification connected to a client for example within the classification "invoice". The combination of identification criteria and of classification criteria refine the classification.

As a function of the classification criteria defining a classification, the document can be accessible by several search routes.

When the document to be published does not respond to any of the identification criteria, there is the possibility of defining new identification criteria and new classification criteria to define in the memory a corresponding classification so as to permit its copying and its automatic filing according to these new criteria and the automatic filing of further documents having the same criterion which will be subsequently published.

What is claimed is:

1. Process for the automatic identification of a document in a computer, comprising the steps of: creating a document in a text editor of a computer; analyzing the data contained in the document according to at least one of a content of the data and their a position of the data in the document; comparing the data one by one to one or more identification criteria of documents, an identification criterion being defined by at least one of the content and the position of a datum characteristic of a document; and copying the document into a memory of the computer according to the identification criterion, without user interaction wherein, when the comparison is negative, a parametric window is opened to define at least one new identification criterion associated with this document, said new criterion being memorized to identify thereafter any document having this datum.

2. Process according to claim 1,
   characterized in that an identification criterion is defined by copying a datum of the text of the document serving as an identification criterion toward the parametric window where this datum is copied, associated with its position parameters in the document.

3. Process for automatic classification and filing of documents emitted from a computer, comprising the steps of:
   during the sending of a document to be published toward a publication support, analyzing the data contained in the document according to at least one of, their content and their position in the document and they are compared one by one to one or more of the identification criteria of the document, an identification criterion being defined by at least one of the content and the position of a characteristic datum of a document;
   comparing the data of the document to at least one classification criterion, each criterion corresponding to a type of document to be classified and a classification in the memory of the computer in which are memorized documents having this criterion; and
   when the comparison is negative, there can be defined at least one new identification criterion corresponding to a type of document and at least one classification criterion corresponding to a classification in the memory of the computer in which is copied said document; and,
   when the comparison is positive, said document is automatically copied into the memory of the computer according to the corresponding classification or classifications.

4. Process according to claim 3, characterized in that, when the comparison is negative, a parametric window is opened to define at least one new identification criterion associated with this document and at least one classification criterion, said new identification criterion being memorized to identify thereafter any document having the same identification criterion and the classification criterion controlling its automatic filing in the associated classification.

5. Process according to claim 4, characterized in that an identification criterion is defined by copying a datum of the text of the document serving as an identification criterion, toward the parametric window where this datum is copied associated with its position parameters in the document.

6. Process according to claim 3, characterized in that the data contained in the document are analyzed by analyzing and transcoding the signals emitted from the computer toward the publication support.

7. Device for automatic classification and filing of documents emitted from a computer comprising:
means for analyzing the data contained in a document to be published, emitted from a computer toward a publication support,
means for comparing said data one by one with one or several memorized identification criteria,
means for copying into the memory of the computer the document upon a positive identification, and
means for defining at least one identification criterion and at least one classification criterion of a document upon a negative comparison.

8. Device according to claim 7, characterized in that the means for defining an identification criterion of the document comprise means for copying into the document the datum serving as an identification criterion, said datum being copied with its positioning parameters in the document from the document.

9. Device according to claim 7, characterized in that the identification criterion and the classification criterion are defined at the time of emission of the document toward the publishing support.

10. Device according to claim 7, characterized in that all of the unidentified published documents from one or several computers are temporarily stored in a library where a user, preferably an authorized one, can cause the analysis of these documents.

11. A computer readable medium embodying computer instructions for a process to automatically identify a document in a computer and for causing the computer to execute the steps of:
analyzing data of a document by performing at least one datum analysis according to a datum content or a datum position in the document to obtain at least one datum analysis result;
obtaining a comparison result by comparing each datum analysis result to at least one document identification criteria, each identification criterion being defined by at least one of the content and the position of a datum characteristic of a document; and
characterizing data contained in the document based on the obtained comparison result,
wherein said analyzing data step is performed when the document is sent from a computer to a publishing support.

12. The computer readable medium of claim 11, wherein, when the obtained comparison result is negative, the medium comprises further instructions causing the computer to open a parametric window to define at least one new identification criterion datum associated with the document, the new criterion being memorized to identify thereafter any document having the new identification criterion datum.

13. The computer readable medium of claim 12, wherein, the new identification criterion datum is defined by copying a datum of a text of the document serving as a new identification criterion reference datum toward the parametric window where the reference datum is copied and associated with its document position parameters.

14. The computer readable medium of claim 11, wherein, when the obtained comparison results are positive, the medium comprises further instructions causing the computer to automatically copy the document into a memory of the computer according to a corresponding classification or classifications.

15. The process according to claim 1, wherein the data contained in the document is analyzed based on the content of the data.

16. The process according to claim 15, further comprising the step of automatically filing the document to memory based on the identification criteria.

* * * * *